US012625050B2

(12) United States Patent
Nestor

(10) Patent No.: US 12,625,050 B2
(45) Date of Patent: May 12, 2026

(54) EXPANDABLE PLUG AND PRESSURE TOOL FOR USE IN METALLIC WICK PORE SIZE TESTING

(71) Applicant: Westinghouse Electric Company LLC, Cranberry Township, PA (US)

(72) Inventor: Christopher M. Nestor, Murrysville, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 294 days.

(21) Appl. No.: 18/499,904

(22) Filed: Nov. 1, 2023

(65) Prior Publication Data

US 2025/0137903 A1     May 1, 2025

(51) Int. Cl.
G01N 15/08          (2006.01)
(52) U.S. Cl.
CPC .................................. G01N 15/088 (2013.01)
(58) Field of Classification Search
None
See application file for complete search history.

(56) References Cited

U.S. PATENT DOCUMENTS

| | | | |
|---|---|---|---|
| 2002/0122541 A1 | 9/2002 | Metcalf | |
| 2006/0016215 A1 | 1/2006 | Tonkovich et al. | |
| 2006/0196641 A1* | 9/2006 | Hong ................... | F28D 15/046 |
| | | | 165/104.33 |

| | | | |
|---|---|---|---|
| 2013/0009120 A1 | 1/2013 | Munro, III et al. | |
| 2013/0160976 A1* | 6/2013 | Wu ....................... | F28D 15/046 |
| | | | 165/104.26 |
| 2018/0221574 A1* | 8/2018 | Dunki-Jacobs ... | A61M 5/16813 |
| 2024/0105354 A1 | 3/2024 | Heibel | |
| 2025/0003694 A1* | 1/2025 | Chao ................... | F28D 15/0266 |

FOREIGN PATENT DOCUMENTS

| | | |
|---|---|---|
| CN | 101035601 A | 10/2010 |
| CN | 114951691 A | 8/2022 |
| WO | 2021/076673 A1 | 4/2021 |

OTHER PUBLICATIONS

Search Report for corresponding Taiwan Application No. 113141765 mailed on Jun. 26, 2025.

* cited by examiner

*Primary Examiner* — Stephanie E Bloss
*Assistant Examiner* — Diana Hancock
(74) *Attorney, Agent, or Firm* — K&L Gates LLP

(57)          ABSTRACT

Disclosed is a device for performing pore size testing on a mesh wick. The device includes a housing and a tube positioned through the housing. The housing includes an internal surface. The tube includes an exterior surface. The exterior surface of the tube and the internal surface of the housing cooperatively define an internal cavity therebetween. The device further includes an inlet pipe extending from the housing. The inlet pipe connects to the internal cavity to allow a fluid to enter the internal cavity through the inlet pipe. The device further includes an expandable bladder positioned around a portion of the housing. The expandable bladder includes a first end and a second end. The portion of the housing is to allow the fluid to exit the internal cavity through the housing into the expandable bladder which causes the expandable bladder to expand.

15 Claims, 7 Drawing Sheets

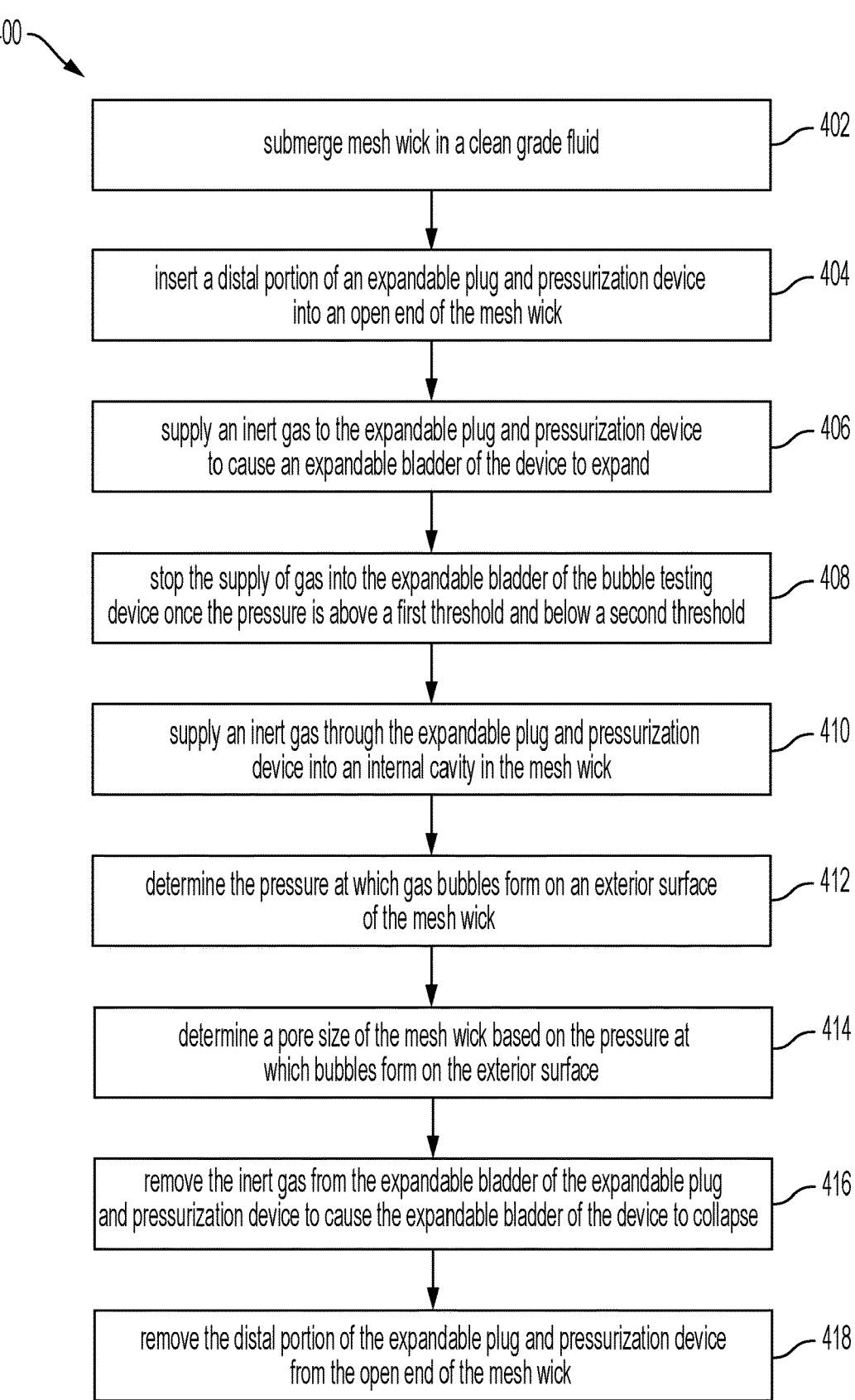

400 submerge mesh wick in a clean grade fluid — 402 insert a distal portion of an expandable plug and pressurization device into an open end of the mesh wick — 404 supply an inert gas to the expandable plug and pressurization device to cause an expandable bladder of the device to expand — 406 stop the supply of gas into the expandable bladder of the bubble testing device once the pressure is above a first threshold and below a second threshold — 408 supply an inert gas through the expandable plug and pressurization device into an internal cavity in the mesh wick — 410 determine the pressure at which gas bubbles form on an exterior surface of the mesh wick — 412 determine a pore size of the mesh wick based on the pressure at which bubbles form on the exterior surface — 414 remove the inert gas from the expandable bladder of the expandable plug and pressurization device to cause the expandable bladder of the device to collapse — 416 remove the distal portion of the expandable plug and pressurization device from the open end of the mesh wick — 418

FIG. 14

EXPANDABLE PLUG AND PRESSURE TOOL FOR USE IN METALLIC WICK PORE SIZE TESTING

GOVERNMENT CONTRACT

This invention was made with government support under DE-NE0009050 awarded by the U.S. Department of Energy. The government has certain rights in the invention.

BACKGROUND

The present disclosure relates to testing metallic wicks that are used in heat pipes. Heat pipes can be used to cool a variety of devices and systems that are under a variety of different conditions. To ensure that the heat pipe will function properly, the size of the pores of the metallic wick inside of the heat pipe need tested.

SUMMARY

In one general aspect, the present disclosure provides a device for performing pore size testing on a mesh wick. The device includes a housing including an internal surface. The device further includes a tube positioned through the housing. The tube includes an exterior surface. The housing is sealed around the exterior surface of the tube where the tube enters and exits the housing. The exterior surface of the tube and the internal surface of the housing cooperatively define an internal cavity therebetween. The device further includes an inlet pipe extending from the housing, wherein the inlet pipe connects to the internal cavity to allow a fluid to enter the internal cavity through the inlet pipe. The device further includes an expandable bladder positioned around a portion of the housing. The expandable bladder includes a first end and a second end. The first end and the second end are both attached and sealed to the exterior of the housing. The portion of the housing is configured to allow the fluid to exit the internal cavity through the housing into the expandable bladder which causes the expandable bladder to expand.

In at least one aspect, the housing is sealed to the tube through welding.

In at least one aspect, the first end is sealed to the tube with a polymer and hardener.

In at least one aspect, the second end is sealed to the tube with a circumferential tensioning device.

In at least one aspect, the expandable bladder is sized to permit the first end of the expandable bladder to be inserted into an open end of the mesh wick in an unexpanded configuration, and the fluid inserted into the inlet pipe causes the expandable bladder to expand and seal the open end of the mesh wick in an expanded configuration. In at least one aspect, the expandable bladder is pressurized to greater than or equal to a first threshold and less than or equal to a second threshold, in the expanded configuration. In at least one aspect, an input to the inlet pipe is coupled to a relief valve, and wherein the expandable bladder can be collapsed by way of the relief valve to the unexpanded configuration. In at least one aspect, a first end of the tube is coupled to a supply of a second fluid and a second end of the tube is inserted into the open end of the mesh wick.

In at least one aspect, the housing defines a hole positioned in the portion of the housing, and the fluid exits the internal cavity through the hole.

In another general aspect, the present disclosure provides a device for performing pore size testing on a mesh wick. The device includes a first tube includes a first end and a second end. The device further includes a second tube inserted through the first tube. The first end and the second end are both attached and sealed to an exterior surface of the second tube. The exterior surface of the second tube and an internal surface of the first tube cooperatively define an internal cavity therebetween. The device further includes an inlet tube extending from the first tube. The inlet tube connects to the internal cavity to allow a fluid to enter the internal cavity through the inlet tube. The device further includes an expandable bladder positioned around a portion of the first tube. The expandable bladder includes a third end and a fourth end. The third end and fourth end are both attached and sealed to an exterior surface of the first tube. The portion of the first tube is configured to allow the fluid to exit the internal cavity through the exterior surface of the first tube into the expandable bladder causing the expandable bladder to expand.

In at least one aspect, the first tube further includes a first diameter, wherein the second tube includes a second diameter, and wherein the second diameter is larger than the first diameter.

In at least one aspect, the first tube defines a hole positioned in the portion of the first tube, and wherein the fluid exits the internal cavity through the hole.

In at least one aspect, the fourth end is sealed to the tube with a polymer and hardener.

In at least one aspect, the third end is sealed to the tube with a circumferential tensioning device.

In at least one aspect, the fourth end of the expandable bladder in an unexpanded configuration is inserted into an open end of the mesh wick, wherein the fluid inserted into the inlet tube causes the expandable bladder to expand to an expanded configuration to seal the open end of the mesh wick.

In yet another general aspect, the present disclosure provides a method for performing a pore size test on a mesh wick. The mesh wick includes a sealed end and an open end. The method includes submerging the mesh wick in a liquid, inserting a portion of a pore size testing device into the open end of the mesh wick, and supplying a first gas to the pore size testing device to cause an expandable bladder of the pore size testing device to expand. The expandable bladder is positioned on the portion of the pore size testing device. The expanding of the expandable bladder forms a seal between the mesh wick and the pore size testing device. The method further includes supplying a second gas through the pore size testing device into an internal cavity in the mesh, wherein the second gas pushes the liquid out of the internal cavity and through the mesh wick. The method further includes determining a pressure at which bubbles of the second gas form outside of the mesh wick, determining a pore size of the mesh wick based on the pressure, and removing the first gas from the pore size testing device to cause the expandable bladder of the pore size testing device to collapse. The collapsing of the expandable bladder removes the seal between the mesh wick and the pore size testing device. The method further includes removing the portion of the pore size testing device from the open end of the mesh wick.

In at least one aspect, the first gas is supplied into the expandable bladder to a pressure that is greater than or equal to a first threshold and less than or equal to a second threshold.

In at least one aspect, wherein the first gas is removed through a relief valve.

In at least one aspect, the first gas and the second gas are the same gas supplied from the same gas supply.

BRIEF DESCRIPTION OF THE FIGURES

The novel features of the various aspects are set forth with particularity in the appended claims. Throughout the FIGS., like reference characters designate like or corresponding parts throughout the several views of the drawings. The described aspects, however, both as to organization and methods of operation, may be best understood by reference to the following description, taken in conjunction with the accompanying drawings in which:

FIG. 14 illustrates an example method of using the device of FIG. 5 for performing pore size testing of a wick structure, according to at least one aspect of the present disclosure.

DESCRIPTION

Figures 1, 2, 3, 4:
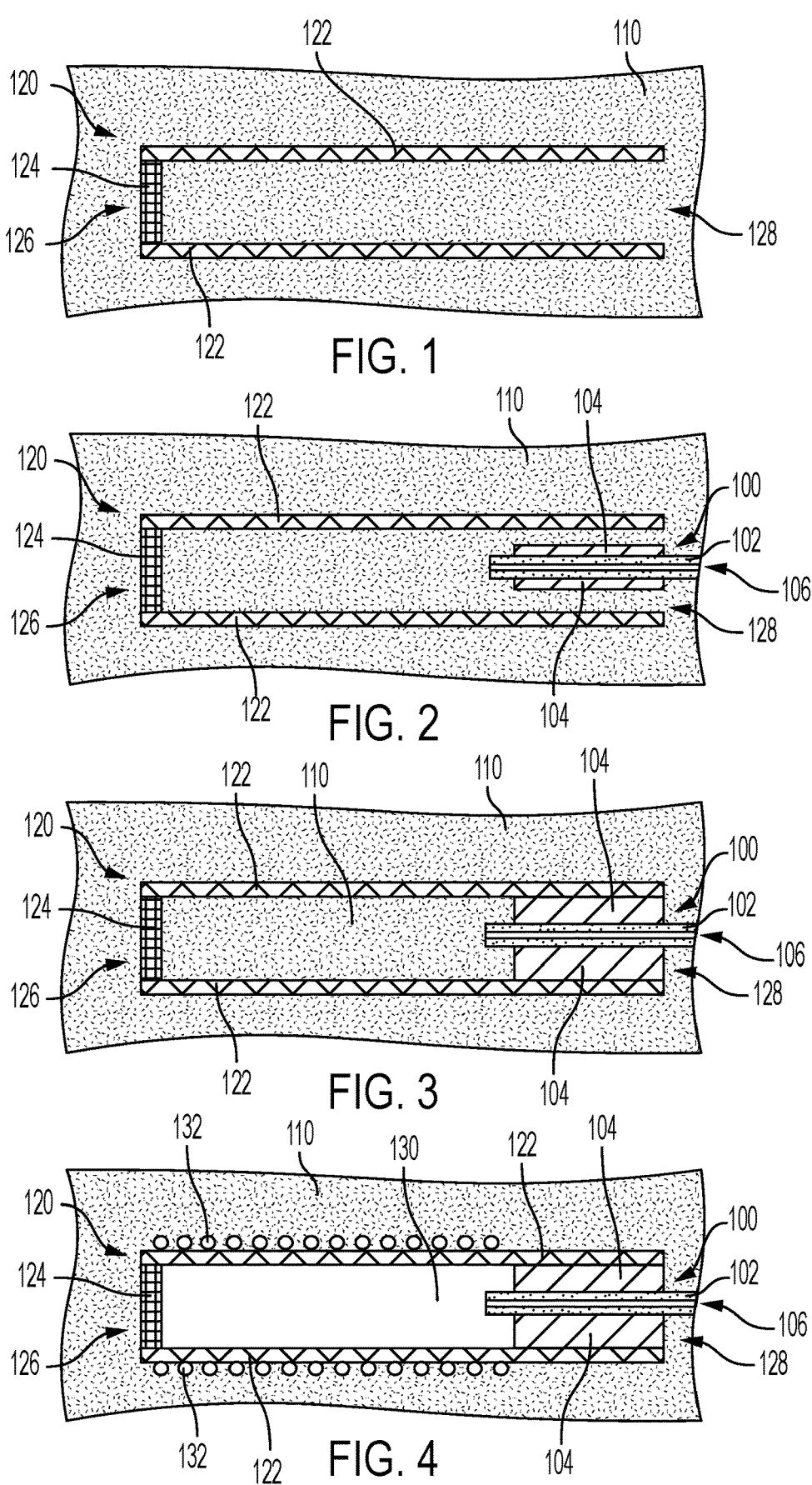
FIGS. 1-4 illustrate a diagram of an example for pore size testing a mesh wick placed inside of a liquid, according to at least one aspect of the present disclosure.

Numerous specific details are set forth to provide a thorough understanding of the overall structure, function, manufacture, and use of the aspects as described in the disclosure and illustrated in the accompanying drawings. Well-known operations, components, and elements have not been described in detail so as not to obscure the aspects described in the specification. The reader will understand that the aspects described and illustrated herein are non-limiting examples, and thus, it can be appreciated that the specific structural and functional details disclosed herein may be representative and illustrative. Variations and changes thereto may be made without departing from the scope of the claims. Furthermore, it is to be understood that such terms as "top," "bottom," "forward," "rearward," "left," "right," "upwardly," "downwardly," and the other such words are words of convenience and are not to be construed as limiting terms.

It should be noted that the illustrative examples are not limited in application or use to the details of construction and arrangement of parts illustrated in the accompanying drawings and description. The illustrative examples may be implemented or incorporated in other aspects, variations, and modifications, and they may be practiced or carried out in various ways. Further, unless otherwise indicated, the terms and expressions employed herein have been chosen for the purpose of describing the illustrative examples for the convenience of the reader and are not for the purpose of limitation thereof. Also, it will be appreciated that one or more of the following described aspects, expressions of aspects, and/or examples can be combined with any one or more of the other following described aspects, expressions of aspects, and/or examples.

In general, heat pipes are used to facilitate heat removal from a wide variety of electronics and other systems. In general for electronics, heat pipes run at lower temperatures and are used for cooling items such as laptops, phones, satellites, enclosure cooling devices, and devices in avionic systems. The heat pipes can also be designed to operate in high temperatures. For example heat pipes can be used to transfer heat out of a nuclear reactor core. This disclosure will use nuclear reactor heat pipes as an example; however, other applications for heat pipes are envisioned.

High-temperature, high-performance alkali metal heat pipes can be used in a nuclear reactor to transfer heat from a nuclear reactor core to heat exchangers. Nuclear heat is transferred through the wall of the heat pipe causing the alkali metal to evaporate at a liquid film interface on a wick surface in an evaporator region of the heat pipe. The alkali metal evaporates to sodium vapor that moves from the evaporator region to a condenser region of the heat pipe where the sodium condenses prior to restarting the fluid transportation to the evaporator region by way of capillary action within the wick structure. The wick design is simple and promotes effective capillary pumping requiring specific pore sizes that are achievable in the wick through manufacturing processes.

Flow of vapor away from the evaporator region and liquid away from the condenser region serves to form a network of pressure losses in the heat pipe. The network of pressure losses creates a differential pressure across a liquid meniscus of the wick, greatest in magnitude within the evaporator region of the heat pipe. For the wick to fully function as a capillary pump, the wick must not contain any defects that cause the capillary capability of the wick to drop below local pressure differentials. In addition, the ends of the wick must be sealed to prevent bypass of vapor flow. A pool of liquid sodium forms at the end of the condenser region, which serves to plug this end of the wick. In the evaporator region, a solid plug that is bonded or mechanically attached to the wick is required to provide a seal equivalent to or greater than the capillary capability of the wick. Sufficient cohesion and adhesion (i.e., low contact angle) of liquid sodium to internal heat pipe surfaces is required to maintain wetting of the heat pipe annulus and capillary pumping of liquid sodium. Effective heat pipe component cleaning methods are imperative to remove oils from manufacturing, non-metallic impurities, etc., which can impact the wettability of surfaces and the ability to maintain capillary pumping capability.

The final contributing influencer on the capillary pumping capability is the wick pore size. A pore size test is performed on a wick to ensure that the wick contains a sufficient effective pore size after manufacturing and that the capillary pressure of the wick is up to calculated performance limits. The pore size test identifies a pressure at which capillary forces no longer hold back the flow of a gas through the wick while submersed under a clean grade liquid. The pore size test is one of the only verifications currently available to demonstrate that a wick is acceptable for heat pipe use. Without this test, the degree of uncertainty with heat pipe operation is exponentially higher.

A general setup for pore size testing (i.e., bubble testing) a metallic wick will now be described. The metallic wick structure is a semi-rigid tube constructed of multiple layers of metal wire mesh. The metallic wick structure has two ends. The first end (i.e., the evaporator region end) requires a solid plug be attached for capillary pumping to occur in the heat pipe. The plug completely seals the first end and the plug is attached to the wick structure itself. The second end (i.e., the condenser region end) is open and a semi-permanent plug acts as both a sealing surface and pressure inlet for an inert gas. In order for pore size testing to function, the wick structure and any subsequent tooling need to be submerged within a clean grade fluid, i.e. a clean grade liquid. Some examples of a clean grade liquids are deionized water, alcohol, etc. The fluid is wetted onto both the inner diameter and outer diameter of the wick structure. There is a requirement to carefully plug the condenser end under the atmospheric surface level of the fluid. For example, the wick structure is fully submerged in the fluid and the semi-permanent plug is inserted into the condenser region end, while the wick structure and semi-permanent plug are fully submerged in the fluid. The condenser semi-permanent end plug requires some kind of pass-through feature that allows inert gas to flood into the inner diameter space of the wick structure. The inert gas pushes out the fluid the wick is submerged in through the pores of the wick itself. Once all the liquid is driven out of the inner diameter of the wick, there becomes a pressure where the pore surface tension can no longer hold back the pressure boundary of the inert gas, and thus, the inert gas begins to "bubble" out of the wick structure. The point where bubbles begin to appear on the exterior surface of the wick structure is called the "bubble point." The bubble point can be measured on an upstream pressure transducer or pressure gauge. The pressure at the bubble point can be used to calculate the pore size of the wick structure. While the same mesh material and procedures can be followed for each wick that is manufactured, there remains variability in the manufacturing process that each wick must be checked to ensure that proper pore size is established for correct capillary pumping required for heat pipe operation.

There can be issues with some methods of performing pore size testing on a wick structure. For example, a tapered plug can be used as the semi-permanent plug to seal the condenser end for performing the pore size test; however, a tapered plug does not engage the inner diameter of the wick structure uniformly over a large surface area. As such, there is potential for damaging the condenser end of the wick by inserting the tapered plug too far. Additionally, there is no certainty that the tapered plug is fully engaged with the end of the wick until the pore size test commences. For example, once started, if a leak appears, the pore size test must be stopped, the plug readjusted, and the test reinitiated, which overall increases the time to perform the pore size test. The tapered plug must also be removed from the wick when the pore size test is completed and there is a risk of damaging the wick during removal.

One solution to avoid these issues is an expandable plug and pressurization device that permits at least semi-automation of the pore size test procedure required for wicks used in alkali metal heat pipes. The device is used to form a semi-permanent uniformly expanding plug on one side of the metallic wick structure while also permitting the ability to flow inert gas into the wick as required for pore size testing. The device includes an expandable bladder that fully engages a large circumferential area uniformly around the inner diameter of the wick at the condenser end. This bladder engages with enough force that the wick itself can be supported hanging from the inflatable plug. In at least one aspect, the same inert gas that is used during the pore size testing can be used to expand the bladder.

In at least one aspect, the device for performing pore size testing on a mesh wick includes a housing and a tube positioned through the housing. The tube includes an exterior surface. The housing is sealed around the exterior surface of the tube where the tube enters and exits the housing. The exterior surface of the tube and an internal surface of the housing cooperatively define an internal cavity therebetween. The device further includes an inlet pipe extending from the housing. The inlet pipe connects to the internal cavity to allow a fluid to enter the internal cavity through the inlet pipe. The device further includes an expandable bladder positioned around a portion of the housing. The expandable bladder includes a first end and a second end. The first end and the second end are both attached and sealed to the exterior of the housing. The portion of the housing is configured to allow the fluid to exit the internal cavity through the exterior surface of the housing into the expandable bladder, which causes the expandable bladder to expand.

The expandable plug and pressurization device for performing pore size testing on a mesh wick provides many benefits. The expandable bladder means that there is no need to wedge a high-friction surface (e.g., a tapered rubber plug) into the inner diameter of the wick, which reduces the risk of delaminating the wick. The pressure of the expandable bladder can be increased to within an operational range that ensures sealing with the condenser wick end and prevents over pressurizing the expandable bladder causing "blowing out" of the wick from the inside. The expandable plug and pressurization device simplifies the variability of operator interaction with sealing the plug to the inner diameter of the wick. The device can also be easily inserted and removed with the bladder deflated, which allows the device to be inserted and removed from the wick without touching the wick itself. The pressure is fully controllable for both the expanding bladder and the flow into the inner diameter of the wick. Additionally, the expandable plug and pressurization device can include a fast-action relief valve that can allow the pore size test to be quickly aborted if anything goes wrong. The expandable plug and pressurization device could be used in automation of the pore size testing process and could potentially eliminate human manipulation steps, which can be prone to error.

The expandable plug and pressurization device reduces the time and complexity of pore size testing heat pipe wick structures. This can allow for more heat pipe wicks to be tested over a period of time than other pore size testing methods. Overall, the expandable plug and pressurization device allows for lower cost manufacturing of heat pipes and allows for quality control of heat pipe manufacturing for a variety of heat pipe dimensions due to adjusting the size of the expandable plug and pressurization device. While heat pipe wicks are the example used in the disclosure, the expandable plug and pressurization device for pore size testing is not solely limited to heat pipe wicks and could be used to perform a pore size test on wicks for other applications.

FIGS. 1-4 illustrate a diagram of using an expandable plug and pressurization device for pore size testing, each according to at least one aspect of the present disclosure. FIG. 1 illustrates a wick structure 120 submerged in a clean grade fluid 110. In at least one aspect, the clean grade fluid 110 is in a liquid state. The wick structure 120 includes a cylindrical body 122, a condenser region end 128 that is open, and an evaporator end 126 that has a solid plug 124 attached that seals the evaporator end 126. In at least one aspect, the cylindrical body 122 is a semi-rigid tube constructed of multiple layers of metal wire mesh (i.e., a metallic wick). In at least one aspect, the solid plug 124 is diffusion bonded to the wick structure 120 such that the solid plug 124 seals the evaporator end 126. As shown in FIG. 1, the clean grade fluid 110 fills the inner diameter of the wick structure 120 and surrounds the exterior of the wick structure 120.

FIG. 2 illustrates inserting an end of an expandable plug and pressurization device 100 into the condenser region end 128 of the mesh wick structure 120. In FIG. 2, the expandable plug and pressurization device 100 is in a deflated configuration and does not touch the inner diameter of the wick structure 120 during insertion. The expandable plug and pressurization device 100 includes a housing 102 that has a through-hole 106 to input a fluid (e.g. an inert gas). An expandable bladder 104 is attached around the end of the housing 102 that is inserted into the mesh wick structure 120.

FIG. 3 illustrates the expandable plug and pressurization device 100 in an expanded configuration sealing the condenser region end 128 of the mesh wick structure 120. The expandable bladder 104 is filled with a fluid (e.g., an inert gas) to within a predefined pressure range. In one aspect, the same fluid source used to input a fluid into the through-hole 106 is used to fill the expandable bladder 104. In an alternative aspect, a first fluid source is used to fill the expandable bladder 104 and a second fluid source is used to input a fluid into the through-hole 106, where the fluid from the first fluid source could be the same or different than the fluid from the second fluid source. In at least one aspect, filling the expandable bladder to the predefined pressure range causes the expandable bladder to seal the condenser region end 128 without damaging the wick structure 120 or causing the wick structure 120 to be blown off of the expandable plug and pressurization device 100.

FIG. 4 illustrates the inner diameter of the wick structure 120 filled with a fluid through the through-hole 106. In at least one aspect, the fluid through the through-hole 106 is an inert gas 130. The inert gas 130 pushes the clean grade fluid 110 through the cylindrical body 122 to fill the inner diameter of the wick structure 120. Once all the clean grade fluid 110 is driven out of the inner diameter of the wick structure 120, there becomes a pressure where the pore surface tension of the cylindrical body 122 can no longer hold back the pressure boundary of the inert gas 130, and thus, the inert gas 130 begins to bubble 132 out of the wick structure 120. The point where bubbles 132 begin to appear or form is called the "bubble point." The pressure at the bubble point can be measured on an upstream pressure transducer. The pressure at the bubble point can then be used to calculate the pore size of the wick structure 120. At this point, the pore size test is complete and the expandable plug and pressurization device 100 can be placed in the deflated configuration and removed from the wick structure 120 without damaging the wick structure 120.

Figure 5:
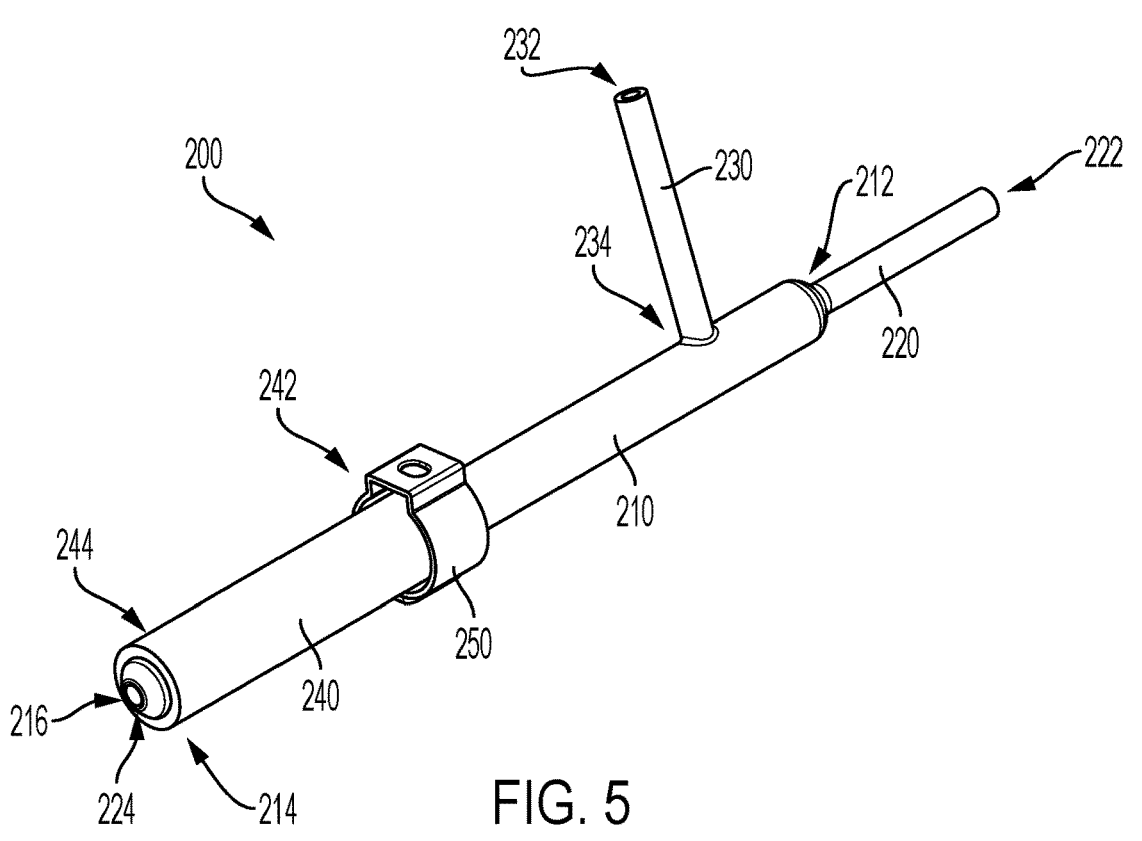
FIG. 5 is a perspective view of an example expandable plug and pressurization device for pore size testing a mesh wick, where the plug device is in a deflated configuration, according to at least one aspect of the present disclosure.
Figure 6:
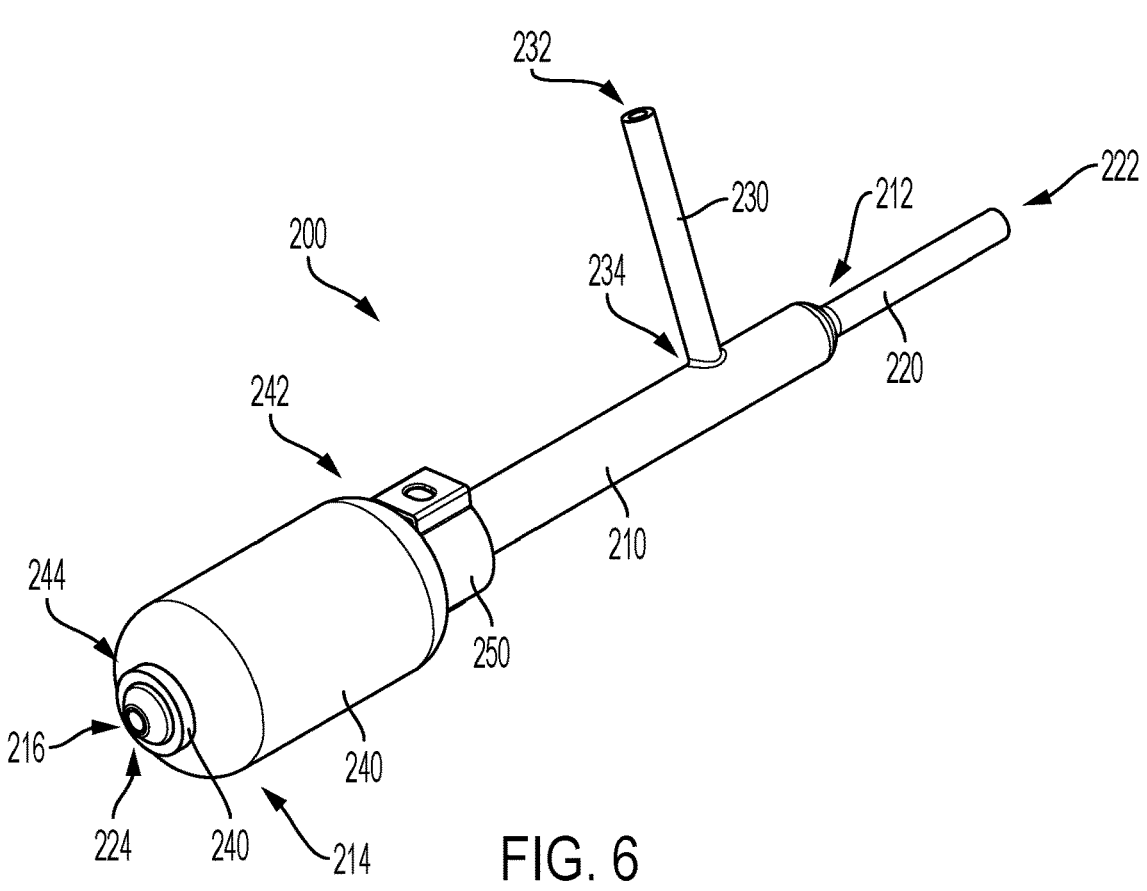
FIG. 6 is a perspective view of the device of FIG. 5 in an expanded configuration, according to at least one aspect of the present disclosure.

FIGS. 5-12 illustrate an example expandable plug and pressurization device 200, each according to at least one aspect of the present disclosure. The expandable plug and pressurization device 200 can be used as shown in FIGS. 1-4 to perform a pore size test on a mesh wick structure. For example, the expandable plug and pressurization device 200 is similar and functions the same as the expandable plug and pressurization device 100. The expandable plug and pressurization device 200 could also be considered a variable diametric plug and pressurization device, a plug and pressurization device, an expandable plug for wick structures, etc. FIG. 5 illustrates the expandable plug and pressurization device 200 in a deflated configuration, and FIG. 6 illustrates the expandable plug and pressurization device 200 in an expanded configuration.

The terms "proximal" and "distal" are used herein in the present disclosure with reference to operating the expandable plug and pressurization device 200 for pore size testing. The term "distal" refers to the portion closest to the wick structure, and the term "proximal" refers to the portion farthest from the wick structure.

The expandable plug and pressurization device 200 includes a housing 210, an inner housing tube 220, an expandable bladder 240, a bladder inlet tube 230, and a circumferential tensioning device 250. The housing 210 has a proximal end 212 and a distal end 214, where the housing 210 extends from the proximal end 212 to the distal end 214. During a pore size test of a wick structure, the distal end 214 is inserted into an open end in the wick structure.

Figures 9, 10:
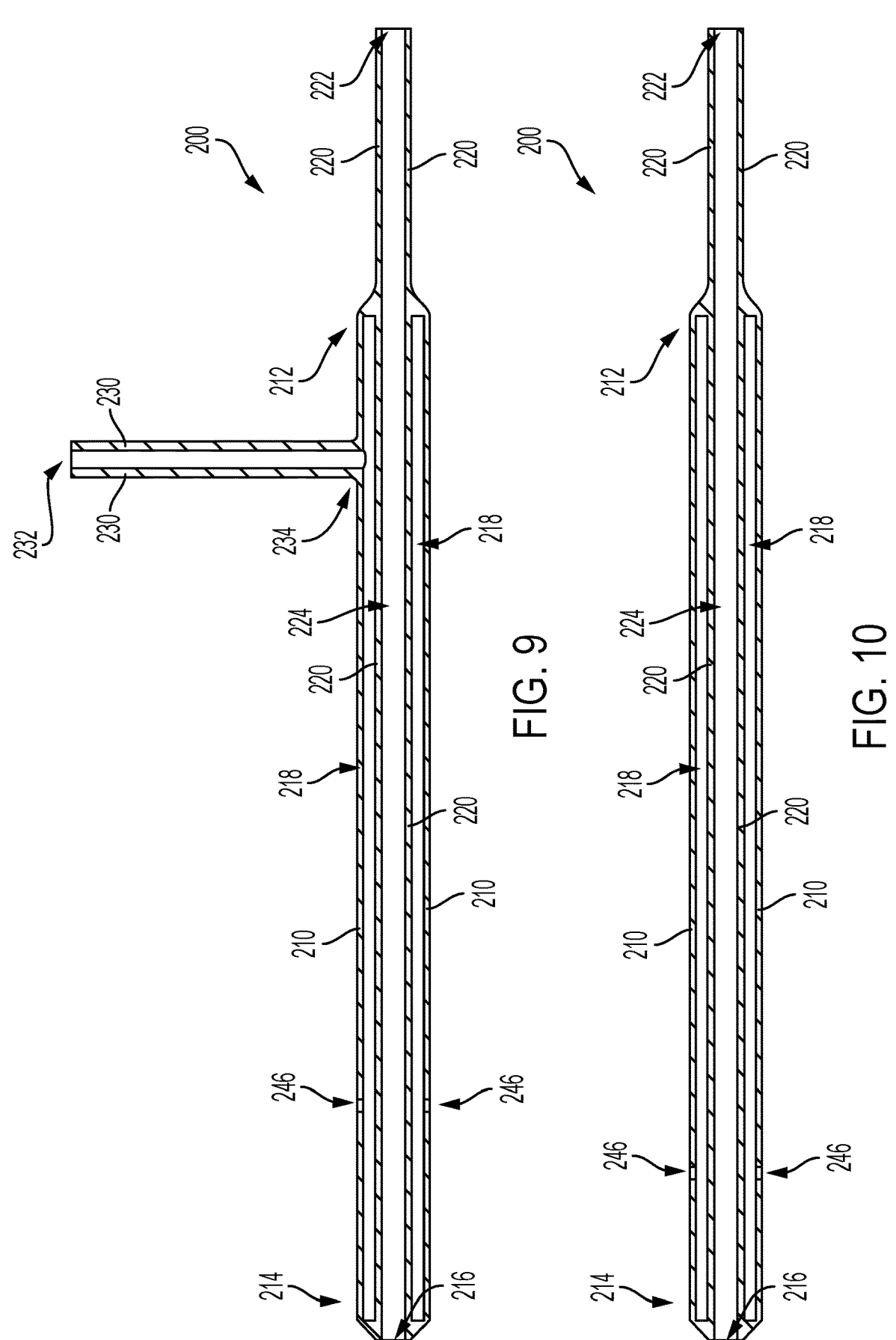
FIG. 9 is a cross-sectional view along line 9-9 detailed in FIG. 8, according to at least one aspect of the present disclosure.
FIG. 10 is a cross-sectional view along line 10-10 detailed in FIG. 8, according to at least one aspect of the present disclosure.
Figure 11:
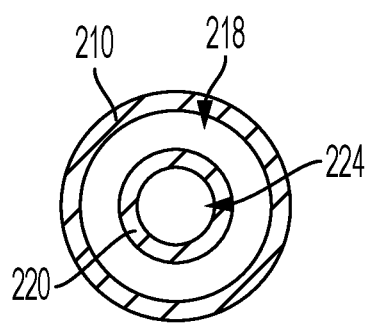
FIG. 11 is a cross-sectional view along line 11-11 detailed in FIG. 8, according to at least one aspect of the present disclosure.

The inner housing tube 220 extends through the center of the housing 210 and extends out of the housing 210 at the proximal end 212. In some aspects, the inner housing tube 220 also extends out of the housing 210 at the distal end 214. The housing 210 is attached and hermetically sealed to the inner housing tube 220 at the proximal end 212 and the distal end 214. The housing 210 and the inner housing tube 220 cooperatively form an internal cavity 218 (FIGS. 9, 10, and 11). In at least one aspect, the housing 210 and the inner housing tube 220 are 316 stainless steel tubing. In some alternative aspects, the housing 210 and the inner housing tube 220 can be made of other materials (e.g., other stainless steels, plastics, carbon steel, aluminum, titanium, or any nickel based alloys). In at least one aspect, the housing 210 includes an annular region at the proximal end 212 and an annular region at the distal end 214, where both annular regions are around the outer circumference of the inner housing tube 220 and are created by weldment. The weldment can use 316 stainless filler to create each annular region that is capable of hermetic sealing. In at least one aspect, the hermetic seal is able to withstand pressure up to, but not including, 15 psi. In an alternative aspect, the hermetic seal is able to withstand pressures of 15 psi or greater.

The attachment of the housing 210 and the inner housing tube 220 at the proximal end 212 and distal end 214 are smoothed to provide a sufficient contour at the proximal end 212 and distal end 214 to prevent any sharp edges and to develop a gradual transition from the inner housing tube 220 to the housing 210. In at least one aspect, the inner housing tube 220 extends beyond the distal end 214 of the housing 210 to allow for sufficient area to attach the distal end 214 of the housing 210 to the inner housing tube 220, which forms a "nose" of the expandable plug and pressurization device 200. In one aspect, the inner housing tube 220 extends beyond the distal end 214 of the housing 210 by approximately 0.25 inches.

In at least one aspect, the housing 210 is a tube and the inner housing tube 220 has an outer diameter that is smaller than the inner diameter of the housing 210. For example, the inner housing tube 220 can be a 0.125-inch tube and the housing 210 can be a 0.25-inch tube. However, any size of tube for the housing 210 is possible as long as the inner housing tube 220 is smaller and fits through the housing 210 (e.g., inner housing tube 220 being a 0.25-inch tube with the housing 210 being a 0.325-inch tube, inner housing tube 220 being a 0.75-inch tube with the housing 210 being a 1-inch tube).

Figure 13:
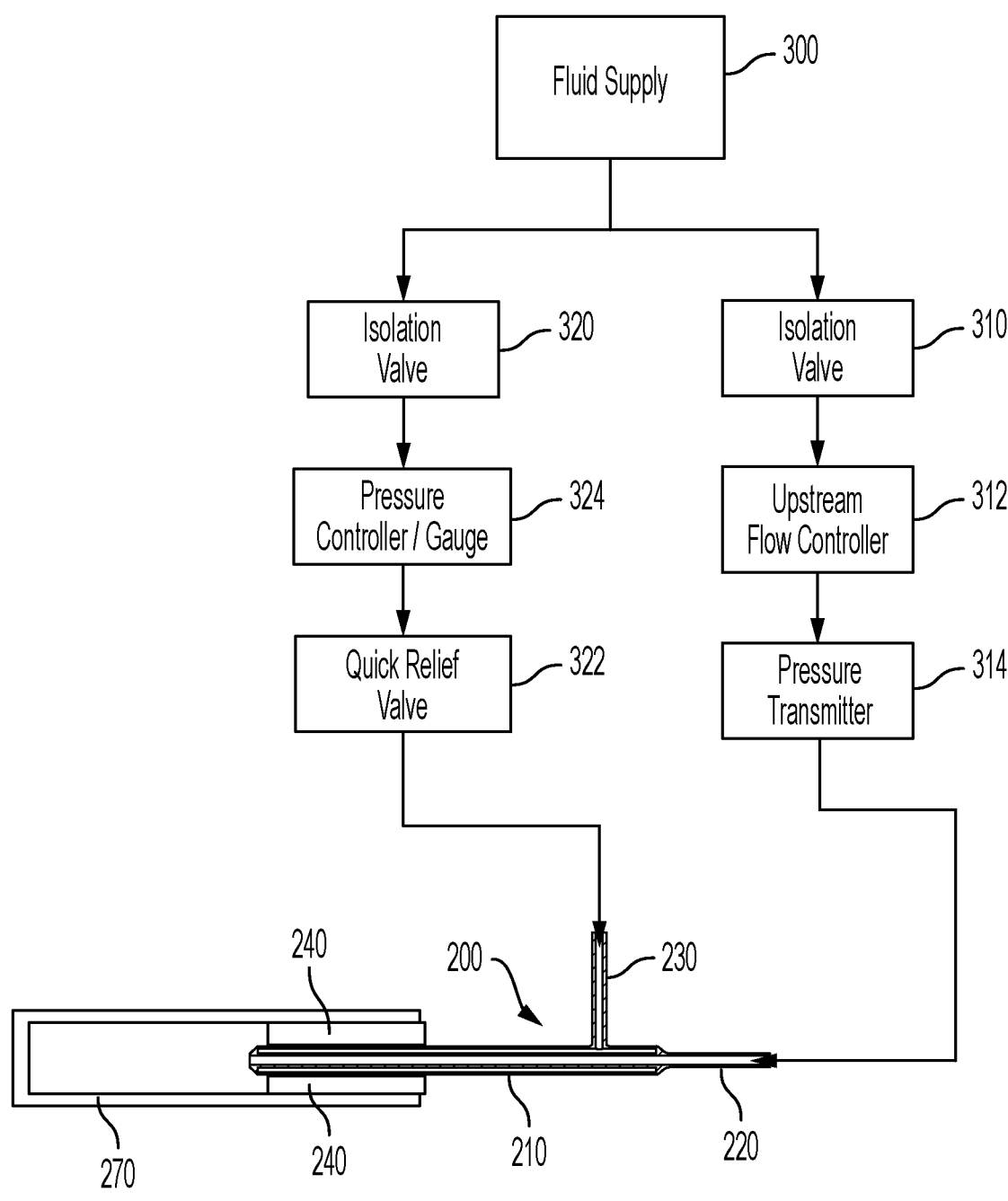
FIG. 13 illustrates an example diagram of a gas supply connected to the device of FIG. 5, according to at least one aspect of the present disclosure.

During a pore size test of a wick structure, a fluid (e.g., an inert gas) enters the inlet 222 of the inner housing tube 220 and goes through a through-hole 224 of the inner housing tube 220 to exit at an outlet hole 216 of the inner housing tube 220. As shown in FIG. 4, this process serves to pressurize the metallic wick structure with an inert gas. In at least one aspect, a pressure sensor (e.g., a transducer) placed upstream of the inner housing tube, described more in regard to FIG. 13, is used to measure the pressure of the inert gas in the wick structure at the bubble point. This pressure can then be used to determine the pore size of the wick structure.

The expandable bladder 240 is positioned around the outer perimeter of the housing 210 and against an exterior surface of the housing 210. A distal end 244 of the expandable bladder 240 is located at the distal end 214 of the housing 210 and extends proximally along the housing 210 until reaching the proximal end 242 of the expandable bladder 240. In at least one aspect, the expandable bladder 240 is a latex tube that slides over the housing 210 at the distal end. A portion of the expandable bladder 240 at the distal end 244 is permanently attached to the exterior surface of the housing 210 at the distal end 214. In at least one aspect, the expandable bladder 240 is permanently attached at the distal end 214 of the housing 210 with a polymer (e.g., a polyepoxide) and a hardener (e.g., a polyfunctional hardener) to form a pressure-sealed polymer (e.g., a pressure-sealed thermosetting polymer). In at least one aspect, any form of polyepoxide and polyfunctional hardener compatible with the clean grade fluid surrounding the wick is suitable (e.g., epoxies of chemical compatibility). In at least one aspect, the pressure-sealed polymer can withstand pressures up to, but not including, 15 psi. In an alternative aspect, the pressure-sealed polymer can withstand pressures of 15 psi and greater.

In at least one aspect, the pressure polymer seal is rated for chemical stability and external chemical resistance while maintaining high mechanical strength properties. The polymer can be applied to the inside lip of the expandable bladder 240 at the distal end 244 and then applied circumferentially around the leading edge of the expandable bladder 240 at the distal end 244. In some aspects, the polymer forms a tapered edge (not shown) from the outer diameter of the expandable bladder 240 to a distal tip of the distal end 214 of the housing 210. Careful attention must be given to not fill the outlet hole 216 or any other holes with the polymer adhesive.

The expandable bladder 240 can be made of any latex, alternative latex, or elastomer with similar durometer with appropriate wall thickness. In some aspects, the expandable bladder 240 is made of latex (or similar material) tubing. Similarly, the expandable bladder could also be made of a sheet of latex (or similar material) that is folded into a cylindrical shape and glued together. Overall, the pressure required to have the expandable bladder 240 expand can be increased or decreased depending on the wall thickness of the latex tubing. This process allows some flexibility in the design to allow for varying wall thicknesses of the expandable bladder 240.

In at least one aspect, the proximal end 242 of the expandable bladder 240 is compressed through the use of a circumferential tensioning device 250 (i.e., clamp). The circumferential tensioning device 250 can include a number of tensioning devices and is not limited to a particular tensioner. For example, the circumferential tensioning device 250 could be a 316 stainless steel Oetiker clamp, nylon tie wrap, 316 stainless steel band clamp suited for the size of the outer tube, etc. The circumferential tensioning device 250 is intended to be removable in the event that any blockage occurs or excess pressure needs relieved. In an alternative aspect, the proximal end 242 could be permanently attached to the housing 210 in a similar manner to the distal end using a polymer and a hardener.

The bladder inlet tube 230 extends from the housing 210 at location 234 transverse from the inner housing tube 220. The bladder inlet tube 230 is attached and sealed to the housing 210. In at least one aspect, the bladder inlet tube 230 is 316 stainless steel tubing. In some alternative aspects, the bladder inlet tube 230 can be made of other materials (e.g., other stainless steels, plastics, carbon steel, aluminum, titanium, or any nickel based alloys). In at least one aspect, the bladder inlet tube 230 is attached to the housing 210 by weldment. The bladder inlet tube 230 connects to the internal cavity 218 (FIG. 9). A fluid (e.g., an inert gas) enters the bladder inlet tube 230 at the inlet 232, then enters the internal cavity 218 and exits the internal cavity 218 into the expandable bladder, which causes the expandable bladder 240 to expand, as shown in FIG. 6.

During pore size testing, the expandable bladder is expanded to seal against the inner diameter of the mesh wick structure as shown in FIGS. 3 and 4. In at least one aspect, the distance from the proximal end 242 to the distal end 244 of the expandable bladder 240 is chosen to allow sealing against the mesh wick structure without damaging the mesh wick structure. For example, the expandable bladder 240 expands to touch the inner diameter of the mesh wick structure and friction force between the mesh wick structure and expandable bladder 240, which keeps the expandable bladder 240 in place during the pore size test. For example, the pressure in the expandable bladder 240 can be increased to increase the friction force required to be overcome to move the expandable bladder out of the mesh wick. Increasing the distance from the proximal end 242 to the distal end 244 of the expandable bladder 240 increases the surface area of the expandable bladder that touches and seals against the inner diameter of the mesh wick structure, which increases the frictional force between the mesh wick structure and expandable bladder 240 due to the increased contact area. Additionally, spreading the contact area between the expandable bladder 240 and mesh wick structure reduces the chance of damaging the mesh wick structure (e.g., due to delamination).

Figures 7, 8:
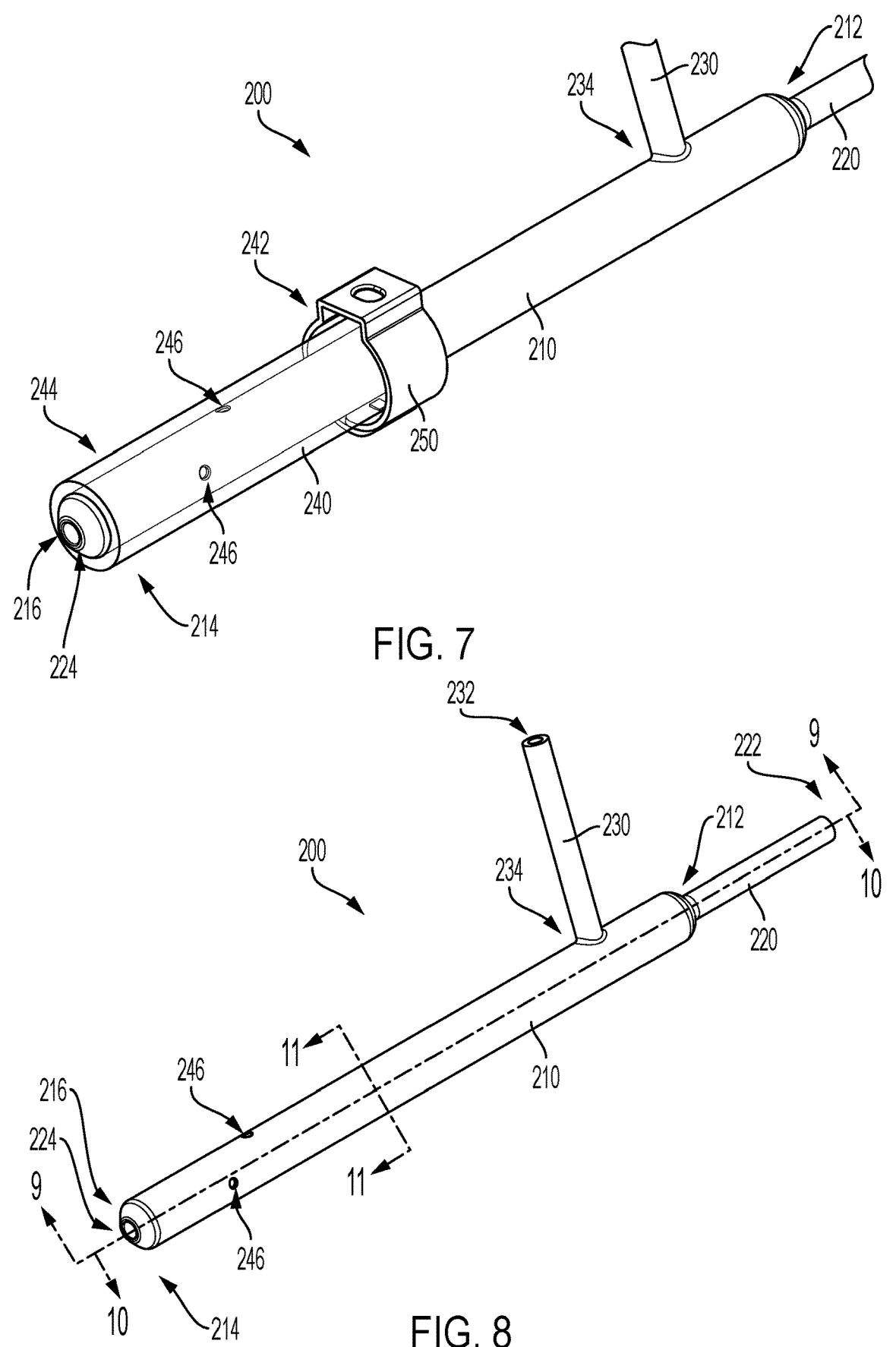
FIG. 7 is a perspective view of the device of FIG. 5 with the expandable bladder shown transparent, according to at least one aspect of the present disclosure.
FIG. 8 is a perspective view of a housing of the device of FIG. 5, according to at least one aspect of the present disclosure.

FIG. 7 is a perspective view of the expandable plug and pressurization device 200 of FIG. 5 with the expandable bladder 240 shown as transparent, and FIG. 8 is a perspective view of the housing 210 of the expandable plug and pressurization device 200 of FIG. 5, both according to at least one aspect of the present disclosure. Fluid exits the internal cavity 218 through annular holes 246 in the housing 210. The annular holes 246 are located between the proximal end 242 and the distal end 244 of the expandable bladder 240. Additionally, as shown in FIG. 7, the annular holes 246 are also between the attachment locations of the expandable bladder 240 and the housing 210. The annular holes 246 are spaced circumferentially around the housing 210 and can also be spaced proximally and distally along the housing 210. FIGS. 9-11 are cross-sectional views that illustrate the internal cavity 218 and the annular holes 246. FIG. 9 is a cross-sectional view along line 9-9 detailed in FIG. 8, FIG. 10 is a cross-sectional view along line 10-10 detailed in FIG. 8, and FIG. 11 is a cross-sectional view along line 11-11 detailed in FIG. 8, each according to at least one aspect of the present disclosure.

As shown in FIG. 11, the internal cavity surrounds the inner housing tube 220 and through-hole 224. Referring to FIGS. 9 and 10, the annular holes 246 extend through the housing 210 and into the internal cavity 218. The annular holes 246 do not extend into the inner housing tube 220. A fluid (e.g., an inert gas) can enter the inlet 232, travel down the bladder inlet tube 230, and then enter the internal cavity 218. The internal cavity 218 then fills with the fluid, and the fluid exits the internal cavity through the annular holes 246 and into the expandable bladder 240, causing the expandable bladder 240 to expand. Four annular holes 246 are shown in the housing 210. While four annular holes 246 are shown in the housing 210, any number of annular holes 246 can be placed circumferentially around the housing 210 between the proximal end 242 and distal end 244 of the expandable bladder 240. It is important that the sizing and positioning of any annular holes 246 are strategic to allow slow, steady flow of the fluid out of the internal cavity 218, causing the expandable bladder 240 to expand. When the bladder inlet tube 230 is connected to an inert gas supply (e.g., argon gas supply, neon gas supply, radon gas supply, or any other inert gas), the inert gas builds pressure in the internal cavity 218, forcing the expandable bladder 240 to expand uniformly.

As shown in FIGS. 1-4, during a pore size test the expandable bladder 240 is placed inside of the open end of a mesh wick structure. The expandable bladder 240 is then caused to expand, as discussed above, to seal the expandable bladder 240 against the wick structure. In at least one aspect, the pressure in the expandable bladder 240 is increased until the pressure is above or equal to a first predetermined threshold and below or equal to a second predetermined threshold. The pressure in the expandable bladder 240 being above or equal to the first predetermined threshold is required for the expandable bladder 240 to expand enough to seal against the wick structure. The pressure in the expandable bladder 240 remaining below or equal to the second predetermined threshold allows the wick structure to not be damaged (e.g., damaged by delamination). In at least one aspect, the first predetermined threshold is 40 psig and the second predetermined threshold is 60 psig. In this aspect, an operator of the expandable plug and pressurization device 200 would increase the pressure in the expandable bladder 240 to approximately 50 psig. The actual values of the first predetermined threshold and the second predetermined threshold could change based on the material, thickness, longitudinal length, etc., of the expandable bladder 240. For example, increasing the wall thickness of the expandable bladder 240 can cause more pressure to be required to expand the expandable bladder 240, causing a higher first predetermined threshold to be required to seal the expandable bladder 240 against the wick structure. In at least one aspect, the first predetermined threshold and the second predetermined threshold are determined by iterative trial and error to find appropriate values.

Figure 12:
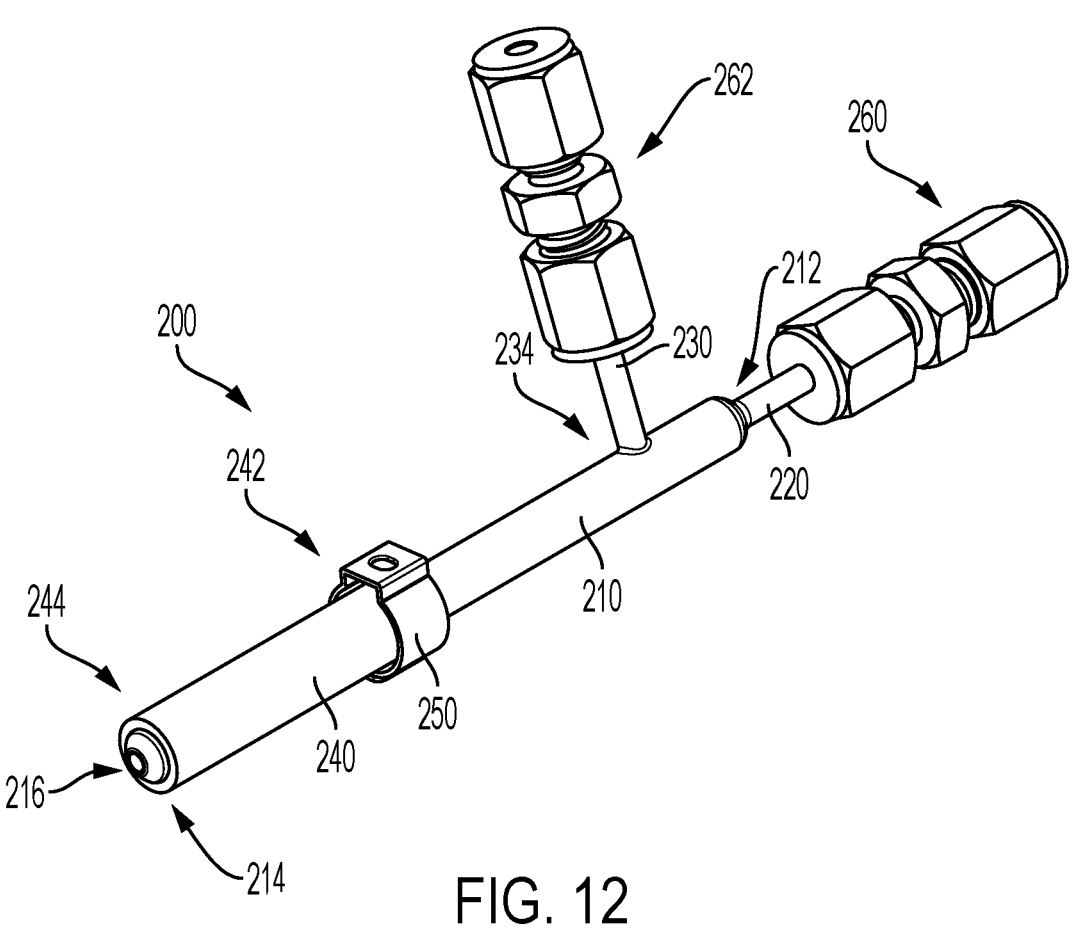
FIG. 12 a perspective view of the device of FIG. 5 with adapters attached to couple the device to an inert gas source, according to at least one aspect of the present disclosure.

FIG. 12 is a perspective view of the device of FIG. 5 with adapters 260, 262 attached to couple the expandable plug and pressurization device 200 to an inert gas source, according to at least one aspect of the present disclosure. The bladder inlet tube 230 is coupled to a fluid supply (e.g., an inert gas fluid supply) by an adapter 262. For example, the inlet 232 of the bladder inlet tube 230 is coupled to the adapter 262, allowing a fluid to enter the bladder inlet tube 230 from a fluid supply. The inner housing tube 220 is coupled to a fluid supply (e.g., an inert gas fluid supply) by an adapter 260. For example, the inlet 222 of the inner housing tube 220 is coupled to the adapter 260, allowing a fluid to enter the inner housing tube 220 from a fluid supply. In at least one aspect, the fluid supply coupled to adapter 260 and the fluid supply coupled to the adapter 262 are the same fluid supply. In an alternative aspect, the fluid supply coupled to adapter 260 and the fluid supply coupled to the adapter 262 are different physical fluid supplies, where the fluid supplied could be the same or different. The adapters 260, 262 can be any tube or pipe adapter (e.g., a Swagelok adapter, DK-LOK adapter, Gyrolok adapter, weldment attachment device) used to connect a tube/pipe to another tube/pipe.

In some aspects, the inner housing tube 220 and/or bladder inlet tube 230 can be welded to another pipe, pipe adapter, and/or device. For example, a weldment attachment device can be welded to the inner housing tube 220 and/or bladder inlet tube 230. One example can be to weld a tapered hose adapter to the inner housing tube 220, which would allow a hose to be attached to the inner housing tube 220. Another example could be to weld a pipe directly to the bladder inlet tube 230.

FIGS. 5-12 illustrate one example of an expandable plug and pressurization device; however, one of ordinary skill in the art understands that this one example of many. For example, changes can be made to the design of the device and still be within the scope of an expandable plug and pressurization device as described herein. Stated another way, different expandable plug and pressurization designs can be created that still perform the same function as the expandable plug and pressurization device described in FIGS. 1-4.

FIG. 13 illustrates an example diagram of a fluid supply 300 (e.g., inert gas supply) connected to the expandable plug and pressurization device 200, according to at least one aspect of the present disclosure. While FIG. 13 illustrates one example setup, other setups are possible and can be easily envisioned by one of ordinary skill. In at least one aspect, the fluid supply 300 supplies an inert gas to the inner diameter of the wick structure 270 through the inner housing tube 220 and also supplies the inert gas to the expandable bladder 240 through the bladder inlet tube 230. In an alternative aspect, separate fluid supplies 300 supply an inert gas separately to the expandable bladder 240 and the inner diameter of the wick structure 270. In this aspect, the two gas supplies could supply the same inert gas or a different inert gas.

The fluid supply 300 is connected to an isolation valve 310, an upstream flow controller 312, a pressure transmitter 314, and then to the inner housing tube 220. The isolation valve 310 allows a user to start and stop the flow of the inert gas into the wick structure 270. The upstream flow controller 312 controls the flow of the inert gas into the wick structure 270. For example, the upstream flow controller 312 can control the flow rate that is allowed into the wick structure, which allows the user to set the flow rate of the inert gas. The pressure transmitter 314 measures the pressure of the inert gas in the wick structure 270. Eventually, as the pressure in the wick structure 270 increases, the bubble point for the pressure in the wick structure 270 will be reached. The pressure measured by the pressure transmitter is then used to determine the pore size of the wick structure 270. Once the bubble point has been reached, a user can turn off the isolation valve 310, stopping more inert gas from entering the wick structure 270.

The fluid supply 300 is connected to an isolation valve 320, a pressure controller/gauge 324, a quick relief valve 322, and then to the bladder inlet tube 230. The isolation valve 320 allows a user to start and stop the flow of the inert gas into the bladder inlet tube 230. The inert gas flowing into the expandable bladder 240 located inside of the wick structure 270 causes the expandable bladder 240 to expand. As discussed above, the pressure of the inert gas inside of the expandable bladder 240 is increased to above or equal to a lower threshold to cause the expandable bladder 240 to seal against the wick structure 270, and the pressure remains below or equal to an upper threshold to ensure that the wick structure 270 is not damaged due to the expandable bladder 240. In at least one aspect, a pressure gauge 324 and the isolation valve 320 are used by a user to allow the pressure in the expandable bladder 240 to increase to be above or equal to the lower threshold while remaining below or equal to the upper threshold. Once the pressure is within the appropriate range, the user can turn off the isolation valve 320, stopping more inert gas from entering the expandable bladder 240. In an alternative aspect, a pressure controller 324 is used to automatically increase the pressure in the bladder to above or equal to the lower threshold while remaining below or equal to the upper threshold. Once the pore size testing is over, a user can use the quick relief valve 322 to quickly decrease the pressure in the expandable bladder 240 for removal of the expandable plug and pressurization device 200 from the wick structure 270. For example, the quick relief valve 322 can be used to allow the expandable bladder 240 to collapse, which allows the expandable bladder to be removed from the wick structure 270.

The quick relief valve 322 can also be used by the user to quickly decrease the pressure in the expandable bladder 240 in the instance of an emergency and/or issue during the pore size test. As discussed above, the circumferential tensioning device 250 can also be used to release inert gas in the expandable bladder 240.

In at least one aspect, the pressure controller 324 and the upstream flow controller 312 are communicable coupled together and control the flow rate of the inert gas into the expandable bladder 240 and the wick structure 270. This process allows for automation of the inert gas into the expandable bladder 240 and the wick structure 270. For example, the upstream flow controller 312 can keep inert gas from entering the wick structure 270 until the pressure of inert gas in the expandable bladder 240 is above or equal to the lower threshold as determined by the pressure controller 324.

FIG. 14 illustrates a method 400 of using the expandable plug and pressurization device 200 for performing pore size testing of a wick structure, according to at least one aspect of the present disclosure. The method 400 includes submerging 402 the wick structure (e.g., wick structure 120 or wick structure 270) in a clean grade fluid. In at least one aspect, the clean grade fluid is in a liquid state. The method 400 further includes inserting 404 distal portion of an expandable plug and pressurization device into an open end of the mesh wick. For example, an expandable bladder located on a distal portion of the expandable plug and pressurization device 200 is inserted into the open end of the mesh wick. The method 400 further includes suppling 406 an inert gas to the expandable plug and pressurization device 200 to cause the expandable bladder 240 of the expandable plug and pressurization device 200 to expand. The method 400 further includes stopping 408 the supply of gas into the expandable bladder 240 of the expandable plug and pressurization device 200 once the pressure is above or equal to a lower threshold and below or equal to an upper threshold. For example, once the pressure is above or equal to the lower threshold, then the expandable bladder 240 is sealed against the inner diameter of the wick structure. The pressure remaining below or equal to the upper threshold keeps the expandable bladder 240 from damaging the wick structure (e.g., due to delamination).

The method 400 further includes suppling 410 an inert gas (e.g., argon gas, neon gas, radon gas, or any other inert gas) through the expandable plug and pressurization device 200 into an internal cavity formed from the inner diameter of the mesh wick and the expandable plug and pressurization device 200 as shown in FIGS. 1-4. As shown in FIG. 4, the inert gas pushes the clean grade fluid through the wick structure. In at least one aspect, the inert gas is supplied to the expandable bladder 240 and to the internal cavity in the wick structure from the same inert gas supply. In an alternative aspect, the inert gas is supplied from different inert gas supplies, one gas supply to the expandable bladder 240 and one gas supply to the internal cavity in the wick structure. In at least one aspect, the different inert gas supplies can supply the same inert gas or different inert gases.

The method 400 further includes determining 412 the pressure at which gas bubbles form on the exterior surface of the mesh wick as illustrated in FIG. 4. In at least one aspect, a user determines the pressure at which gas bubbles form. In an alternative aspect, a control circuit determines the pressure at which gas bubbles form. For example, a control circuit can receive image data of the wick structure from a camera and the pressure data in the wick structure from a pressure transmitter (e.g., pressure transmitter 314) and determine the pressure at which bubbles form based on the pressure data and image data. In at least one aspect, the control circuit can use video analysis to determine a time when bubbles begin to form and then determine from the pressure data the pressure of the inert gas at that time. The method 400 further includes determining 414 the pore size of the mesh wick based on the pressure at which bubbles form on the exterior surface. For example, the control circuit can perform the calculation of the pore size of the mesh wick based on the pressure at which bubbles form on the exterior surface.

The method 400 further includes removing 416 the inert gas from the expandable bladder 240 of the expandable plug and pressurization device 200 to cause the expandable bladder 240 of the expandable plug and pressurization device 200 to collapse. For example, the inert gas can be removed from the expandable bladder 240 through the use of a quick relief valve (e.g., quick relief valve 322). As another example, the control circuit can control a relief valve to release the inert gas from the expandable bladder 240. The method 400 further includes removing 418 the distal portion of the expandable plug and pressurization device 200 from the open end of the mesh wick.

All patents, patent applications, publications, or other disclosure material mentioned herein are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure materials set forth in this disclosure. As such, and to the extent necessary, the disclosure as set forth herein supersedes any conflicting material incorporated herein by reference and the disclosure expressly set forth in the present application controls.

The aspects described herein are understood as providing illustrative features of varying detail of various aspects of the present disclosure, and therefore, unless otherwise specified, it is to be understood that, to the extent possible, one or more features, elements, components, constituents, ingredients, structures, modules, and/or aspects of the disclosed aspects may be combined, separated, interchanged, and/or rearranged with or relative to one or more other features, elements, components, constituents, ingredients, structures, modules, and/or aspects of the disclosed aspects without departing from the scope of the present disclosure. Accordingly, it will be recognized by persons having ordinary skill in the art that various substitutions, modifications, or combinations of any of the exemplary aspects may be made without departing from the scope of the disclosure. In addition, persons skilled in the art will recognize, or be able to ascertain using no more than routine experimentation, many equivalents to the various aspects of the present disclosure described herein upon review of this specification. Thus, the present disclosure is not limited by the description of the various aspects, but rather by the claims.

Those skilled in the art will recognize that, in general, terms used herein, and especially in the appended claims (e.g., bodies of the appended claims), are generally intended as "open" terms (e.g., the term "including" should be interpreted as "including, but not limited to"; the term "having" should be interpreted as "having at least"; the term "includes" should be interpreted as "includes, but is not limited to"). It will be further understood by those skilled in the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those aspects where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together). In those aspects where a convention analogous to "at least one of A, B, or C, etc." is used, in general such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together). It will be further understood by those having skill in the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although claim recitations are presented in a sequence(s), it should be understood that the various operations may be performed in other orders than those that are described, or they may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past tense adjectives are generally not intended to exclude such variants, unless context dictates otherwise.

It is worthy to note that any reference to "one aspect," "an aspect," "one aspect," "an aspect," "an exemplification," "one exemplification," and the like means that a particular feature, structure, or characteristic described in connection with the aspect is included in at least one aspect. Thus, appearances of the phrases "in one aspect," "in an aspect," "in one aspect," "in an aspect," "in an exemplification," and "in one exemplification" in various places throughout the specification are not necessarily all referring to the same aspect. Furthermore, the particular features, structures, or characteristics may be combined in any suitable manner in one or more aspects.

As used herein, the singular form of "a," "an," and "the" include the plural references unless the context clearly dictates otherwise.

Directional phrases used herein, such as, for example and without limitation, "top," "bottom," "left," "right," "lower," "upper," "front," "back," and variations thereof, shall relate to the orientation of the elements shown in the accompanying drawing and are not limiting upon the claims unless otherwise expressly stated.

As used in any aspect herein, the term "control circuit" may refer to, for example, hardwired circuitry, programmable circuitry (e.g., a computer processor including one or more individual instruction processing cores, processing unit, processor, microcontroller, microcontroller unit, controller, digital signal processor (DSP), programmable logic device (PLD), programmable logic array (PLA), or field programmable gate array (FPGA)), state machine circuitry, firmware that stores instructions executed by programmable circuitry, and any combination thereof. The control circuit may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc. Accordingly, as used herein "control circuit" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

The term "about" or "approximately" as used in the present disclosure, unless otherwise specified, means an acceptable error for a particular value as determined by one of ordinary skill in the art, which depends in part on how the value is measured or determined. In certain aspects, the term "about" or "approximately" means within 1, 2, 3, or 4 standard deviations. In certain aspects, the term "about" or "approximately" means within 50%, 200%, 105%, 100%, 9%, 8%, 7%, 6%, 5%, 4%, 3%, 2%, 1%, 0.5%, or 0.05% of a given value or range.

In this specification, unless otherwise indicated, all numerical parameters are to be understood as being prefaced and modified in all aspects by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 100" includes all sub-ranges between (and including) the recited minimum value of 1 and the recited maximum value of 100, that is, having a minimum value equal to or greater than 1 and a maximum value equal to or less than 100. Also, all ranges recited herein are inclusive of the end points of the recited ranges. For example, a range of "1 to 100" includes the end points 1 and 100. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

Any patent application, patent, non-patent publication, or other disclosure material referred to in this specification and/or listed in any Application Data Sheet is incorporated by reference herein, to the extent that the incorporated materials are not inconsistent herewith. As such, and to the extent necessary, the disclosure as explicitly set forth herein supersedes any conflicting material incorporated herein by reference. Any material, or portion thereof, that is said to be incorporated by reference herein but that conflicts with existing definitions, statements, or other disclosure material set forth herein will only be incorporated to the extent that no conflict arises between that incorporated material and the existing disclosure material.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a system that "comprises," "has," "includes," or "contains" one or more elements possesses those one or more elements but is not limited to possessing only those one or more elements. Likewise, an element of a system, device, or apparatus that "comprises," "has," "includes," or "contains" one or more features possesses those one or more features but is not limited to possessing only those one or more features.

What is claimed is:

1. A device for performing pore size testing on a mesh wick, the device comprising:

a housing comprising an internal surface;

a tube positioned through the housing, wherein the tube comprises an exterior surface, wherein the housing is sealed around the exterior surface of the tube where the tube enters and exits the housing, and wherein the exterior surface of the tube and the internal surface of the housing cooperatively define an internal cavity therebetween;

an inlet pipe extending from the housing, wherein the inlet pipe connects to the internal cavity to allow a fluid to enter the internal cavity through the inlet pipe; and an expandable bladder positioned around a portion of the housing, the expandable bladder comprising a first end and a second end, wherein the first end and the second end are both attached and sealed to the exterior of the housing, and wherein the portion of the housing is configured to allow the fluid to exit the internal cavity through the housing into the expandable bladder which causes the expandable bladder to expand.

2. The device of claim 1, wherein the housing is sealed to the tube through welding.

3. The device of claim 1, wherein the first end is sealed to the tube with a polymer and hardener.

4. The device of claim 1, wherein the second end is sealed to the tube with a circumferential tensioning device.

5. The device of claim 1, wherein the expandable bladder is sized to permit the first end of the expandable bladder to be inserted into an open end of the mesh wick in an unexpanded configuration, and wherein the fluid inserted into the inlet pipe causes the expandable bladder to expand and seal the open end of the mesh wick in an expanded configuration.

6. The device of claim 5, wherein the expandable bladder is pressurized to greater than or equal to a first threshold and less than or equal to a second threshold, in the expanded configuration.

7. The device of claim 5, wherein an input to the inlet pipe is coupled to a relief valve, and wherein the expandable bladder can be collapsed by way of the relief valve to the unexpanded configuration.

8. The device of claim 5, wherein a first end of the tube is coupled to a supply of a second fluid and a second end of the tube is inserted into the open end of the mesh wick.

9. The device of claim 1, wherein the housing defines a hole positioned in the portion of the housing, and wherein the fluid exits the internal cavity through the hole.

10. A device for performing pore size testing on a mesh wick, the device comprising:

a first tube comprising a first end and a second end;

a second tube inserted through the first tube, wherein the first end and the second end are both attached and sealed to an exterior surface of the second tube, and wherein the exterior surface of the second tube and an internal surface of the first tube cooperatively define an internal cavity therebetween;

an inlet tube extending from the first tube, wherein the inlet tube connects to the internal cavity to allow a fluid to enter the internal cavity through the inlet tube; and an expandable bladder positioned around a portion of the first tube, the expandable bladder comprising a third end and a fourth end, wherein the third end and fourth end are both attached and sealed to an exterior surface of the first tube, and wherein the portion of the first tube is configured to allow the fluid to exit the internal cavity through the exterior surface of the first tube into the expandable bladder causing the expandable bladder to expand.

11. The device of claim 10, wherein the first tube further comprises a first diameter, wherein the second tube comprises a second diameter, and wherein the second diameter is larger than the first diameter.

12. The device of claim 10, wherein the first tube defines a hole positioned in the portion of the first tube, and wherein the fluid exits the internal cavity through the hole.

13. The device of claim 10, wherein the fourth end is sealed to the first tube with a polymer and hardener.

14. The device of claim 10, wherein the third end is sealed to the first tube with a circumferential tensioning device.

15. The device of claim 10, wherein the fourth end of the expandable bladder in an unexpanded configuration is inserted into an open end of the mesh wick, wherein the fluid inserted into the inlet tube causes the expandable bladder to expand to an expanded configuration to seal the open end of the mesh wick.

*    *    *    *    *